United States Patent [19]

Brenholdt

[11] 3,741,654

[45] June 26, 1973

[54] MEASURING APPARATUS
[75] Inventor: Irving R. Brenholdt, Greenwich, Conn.
[73] Assignee: Farrand Optical Co., Inc., Valhalla, N.Y.
[22] Filed: Mar. 1, 1972
[21] Appl. No.: 230,599

[52] U.S. Cl. .................................. 356/4, 356/5
[51] Int. Cl. ............................................. G01c 3/08
[58] Field of Search ................. 356/4, 5; 95/44 C

[56] References Cited
UNITED STATES PATENTS
3,523,731  8/1970  Mary ..................................... 356/4
3,523,732  8/1970  Mary ..................................... 356/4

OTHER PUBLICATIONS
Chechik, "Radio", Vol. 55, No. 6, 6–1955, p. 63, 356–4.

Primary Examiner—Benjamin A. Borchelt
Assistant Examiner—S. C. Buczinski
Attorney—William E. Beatty

[57] ABSTRACT

Disclosed is a non-contacting measuring system relying upon the difference in the focal points of two transmitted, differently modulated, coaxial light bundles. The difference in intensity of the light reflected back from a to-be-measured object located between the focal points of the two light bundles defines the precise location of the object relative to the two focal points.

6 Claims, 4 Drawing Figures

PATENTED JUN 26 1973

PATENTED JUN 26 1973

MEASURING APPARATUS

BACKGROUND OF THE INVENTION

The present invention relates to the field of non-contacting measuring systems. Prior art systems for non-contacting measurements have typically relied on one or more of the following principles: time lapse, parallax, triangulation, trilateration, automatic focusing, stadimetry, and interferometry. Systems employing the above or other principles have not adequately exhibited the collective capabilities of operation at a large distance from the object to be measured, of a large measuring range, of a high measuring accuracy for a wide range of surface characteristics, of high surface resolution, and of rapid operation.

In accordance with the above background of the invention, it is an object of the present invention to provide a non-contacting measuring system which improves upon the above listed capabilities.

SUMMARY OF THE INVENTION

The present invention is a non-contact measuring system employing two coaxial light bundles focused at two separate points along a common axis. The distance between the focal points represents the operating range over which measurements are made. The transmitted light bundles are each modulated with different frequencies which are reflected from the to-be-measured object, detected and converted to an electrical signal. The difference in energy, in the reflected back signal, between the light from one of the transmitted bundles and the other varies as a function of the relative position of the to-be-measured object between the focal points of the transmitted light bundles. The range over which measurements are made is varied by varying the focal point of one of the light bundles relative to the other. The relative proportion of energy contributed by each of the sources in the reflected back signal is established by detecting the reflected back light with a photoelectric detector. Thereafter, the electrical signal produced is filtered at the different frequencies of modulation to produce two signals representing the energy altributable to each of the transmitted bundles. The difference in amplitude of the two signals is then determined to form a resultant signal which is a measure of the location of the object. The resultant signal is directly proportional to the position of the measured member between the focal points of the two source light bundles.

DETAILED DESCRIPTION

Figures 1, 4:
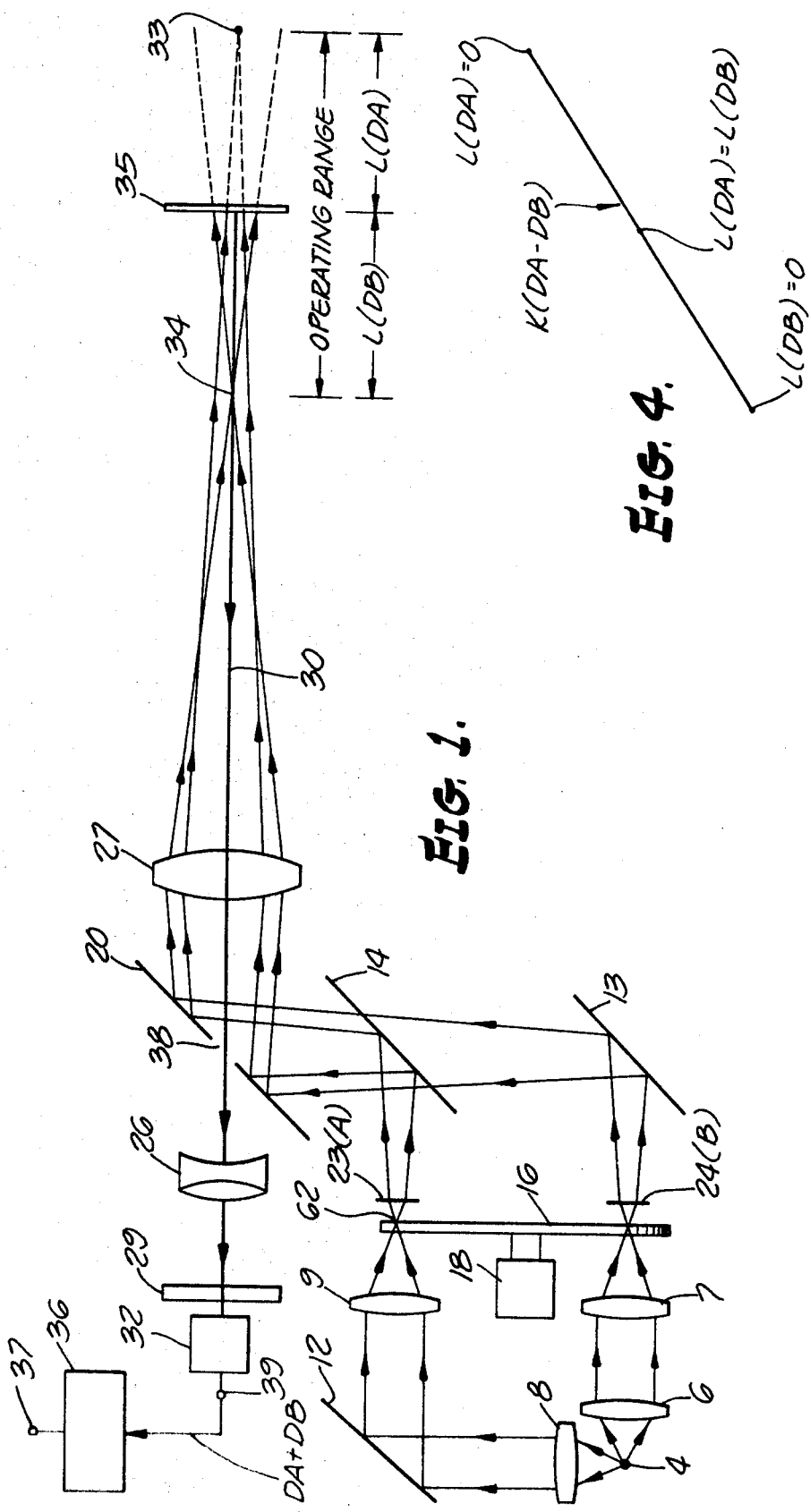
FIG. 1 depicts a schematic representation of a system in accordance with the present invention, showing particularly the optical configuration.
FIG. 4 depicts a waveform representing the output of the apparatus of the present invention.
Figure 3:
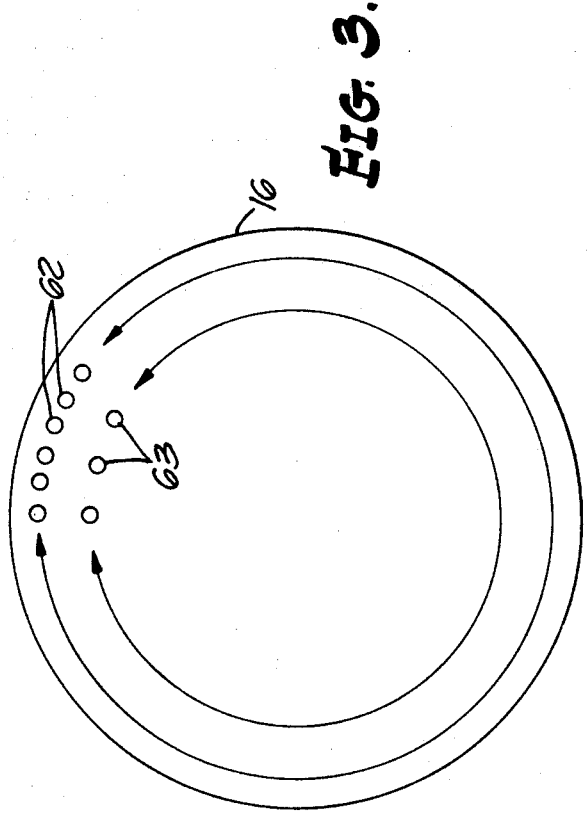
FIG. 3 depicts a multiplexing wheel employed in the system of FIG. 1 for modulating the two light bundles at different frequencies.

In FIG. 1, a source 4 of radiation is positioned to radiate through lenses 6 and 7 to a frequency chopping wheel 16 which generates one of the two modulated source signals. Similarly, source 4 radiates through lens 8 to mirror 12 and lens 9 to the frequency chopping wheel 16. The output from lenses 7 and 9 through the frequency chopping wheel 16 establishes two differently modulated light signals, A and B, respectively, in diffusers 23 and 24, respectively. As shown in FIG. 3, wheel 16 includes two circular patterns of holes 62 and 63 concentric with the shaft of synchronous motor 18. The number of holes 62 through which the light from lens 9 is transmitted is greater than the number of holes 63 through which the light from lens 7 is transmitted. The number of holes in each circular pattern through which light is transmitted is selected to establish, for constant rotation of wheel 16 (e.g., 1 rev. per sec.), two different frequencies (e.g. 5.4 and 3.9 KHz) of modulation for the light transmitted from diffusers 23 and 24 to the beam splitter 14 and the mirror 13, respectively. The light from mirror 13, modulated at 3.9 KHz, is transmitted through beam splitter 14 to mirror 20. Similarly, the light from beam splitter 14 derived from the diffuser 23, modulated at 5.4 KHz, is also relayed to mirror 20. From mirror 20, the transmitted light derived from diffusers 23 and 24 is transmitted by lens 27 to the measuring area indicated as the operating range in FIG. 1. The length of the optical path from diffuser 23 to lens 27 is less than the length of the optical path from diffuser 24 to lens 27. Accordingly, the focal point 34 for the light derived from diffuser 24 is closer to lens 27 than the focal point 33 for the light derived from diffuser 23. This displacement of the focal points 33 and 34 defines the operating range over which measurements, in accordance with the present invention, are made. Specifically, the location of a to-be-measured object 35 relative to its position between focal points 33 and 34 is determined by measuring, with detector 32, the energy, $\overline{DA}$ and $\overline{DB}$, of the reflected light from object 35 transmitted originally from diffuser 23 and diffuser 24, respectively. The bundle 30 of reflected light from object 35 passes back through lens 27 through a hole 38, in mirror 20, through a negative lens 26 and finally through a hole in field stop 29 to the detector 32. The negative lens 26 and the field stop 29 and the lens 27 operate together to define the size of the reflected bundle 30 which is transmitted to detector 32. Rather than a hole in mirror 20, the mirror 20 can be a beam splitter for separating light bundle 30 from the transmitted light.

Detector 32 is typically a conventional photo multiplier tube or other device suitable for detecting the energy level of incident light. The output of detetor 32 at terminal 39 serves as an input to the electronic processor 36. Electronic processor 36 provides an output at terminal 37 which is proportional to the location of object 35 between the focal points 33 and 34.

Figure 2:
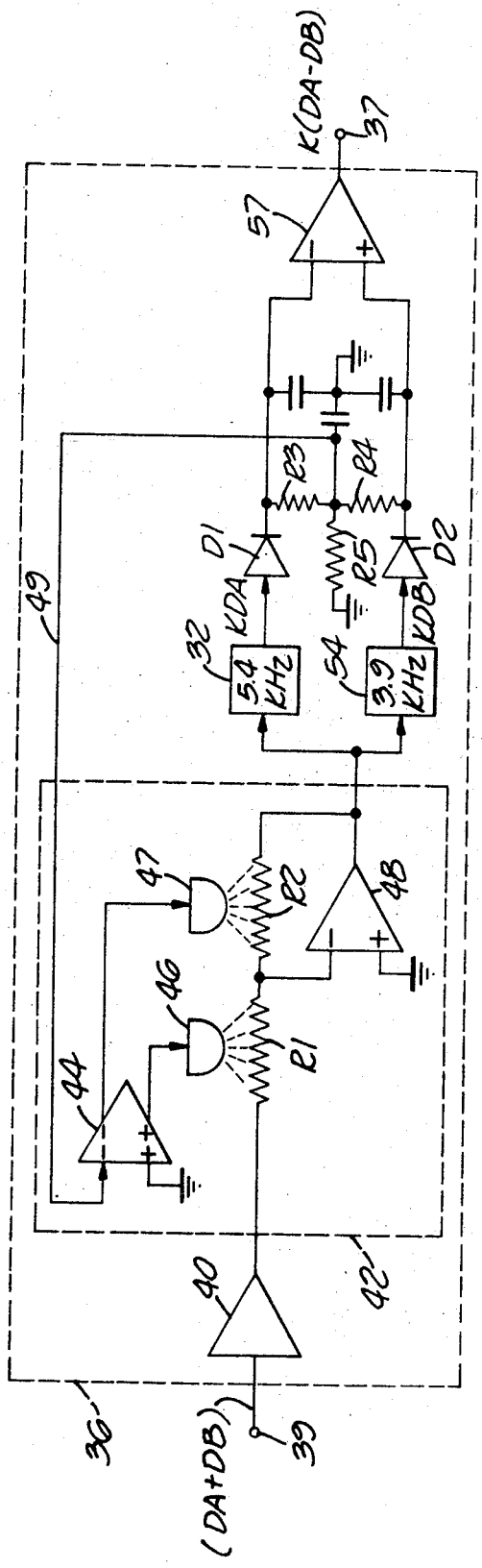
FIG. 2 depicts an electrical schematic of the detecting and computing circuitry of the present invention.

Referring to FIG. 2, the electronic processor 36 of FIG. 1 is shown in greater detail. The output 39 from the detector 32 of FIG. 1 serves as an input to a conventional amplifier 40 in FIG. 2. The output from amplifier 40 serves as an input to a divider and multiplier circuit 42 having light varied resistor R1 and R2. Resistor R1 and R2 are responsive to light emitting diodes 46 and 47, respectively. Light emitting diodes 46 and 47 are energized by the positive and negative outputs of a differential push-pull DC amplifier 44. The positive input of amplifier 44 is connected to ground and the negative input is derived via line 49 from a signal point which is proportional to the sum of the signal DA representing the reflected back light from diffuser 23 and the signal DB repesenting the reflected back light from diffuser 24. The operation of the divider and multiplier circuit 42 is to divide the input signal from amplifier 40 by a proportionality constant which maintains the sum of the electrical signals, DA + DB a constant.

The output from circuit 42 is provided via a conventional amplifier 48. Amplifier 48 has its positive input connected to ground and its negative input connected in common to the variable resistors R1 and R2. Resistor R2 is connected in feed-back relationship from the output of amplifier 48 and the ratio of R1 and R2 establishes the gain of circuit 42. The output from circuit 42 and amplifier 48 is connected in parallel to a 5.4 KHz filter 32 and a 3.9 KHz filter 54.

Referring to FIG. 3, a front view of the wheel 16 is depicted. Wheel 16 includes an outer ring of holes for chopping the light from lens 9 in FIG. 1 and frequency modulating it at a frequency of 5.4 KHz. In a similar manner, wheel 16 includes an inner ring of holes 63 which are closer to the center of wheel 16 and which operate to chop thelight from lens 7 in FIG. 1 at a frequency of 3.9 KHz.

While the frequency chopping wheel of FIG. 16 is one way of producing the two light sources of different modulation frequency, other techniques can be employed. For example, rather than a single source 4 in FIG. 1, two separate sources may be employed where each source is energized with different AC signals, for example, signals at 4 KHz and at 7 KHz. Filters 32 and 54 would then be adjusted accordingly.

OPERATION

Referring now to FIG. 1, the position of object 35 between the focal points 33 and 34 produces a flux density, $\overline{DA}$ and $\overline{DB}$ in detector 32, for each of the signals from diffuser 23 and 24, respectively, proportional to the distance object 35 if from the respective focal points. More particularly, the distance, L(DA) of object 35 from focal point 33 produces an electrical signal DA. Similarly, with object 35, a distance L(DB) from focal point 34, a signal DB is produced. The DA signal has a fundamental frequency of 5.4 KHz whereas the signal DB has a frequency of 3.9 KHz. The operation of electronic processor 36 is to receive the signals DA + DB at terminal 37 a signal K(DA-DB). When L(DB) = L(DA), then the signal at terminal 37 is at a null. When L(DA) is greater than L(DB), the signal is positive; and when DB is greater then DA, the signal is negative. Furthermore, the positive, zero, and engative values have a linear slope which is proportionate to the difference between L(DB) and L(DA) over the operating range from focal point 33 to focal point 34 as depicted in FIG. 4.

Referring to FIG. 2, the operation of the electronic processor 36 is to maintain the linearity of the output signal at terminal 37, even though the sum of the signals DA and DB varies depending on the surface characteristics of the object 35 being measured.

What is claimed is:

1. A measuring apparatus comprising,
   means for modulating first and second light bundles with first and second different characteristics,
   means for focusing said light bundles at first and second different focal points,
   means for detecting resultant radiation from an object located between said focal points whereby the relative position of said object between said focal points is measured by the difference in energy in said resultant radiation derived from said first and said second light bundles.

2. The apparatus of claim 1 wherein said means for modulating modulates said light bundles at two different frequencies.

3. The apparatus of claim 2 wherein said means for modulating includes a source of radiation, a light chopping wheel having two different sets of alternating transparent and opaque areas of different frequencies, means for transmitting light from said source through said sets to modulate said light at two different frequencies.

4. The apparatus of claim 1 wherein said means for focusing coaxially focuses said first and second light bundles whereby said first and second focal points are coaxial.

5. The apparatus of claim 4 wherein said means for detecting is coaxial with said first and second light bundles.

6. The apparatus of claim 5 wherein said detecting means includes an optical detector for forming an electrical signal and means for filtering said electrical signal at two different frequencies corresponding to the two different frequencies of modulation and including means for forming the difference between the two filtered electrical signals.

* * * * *